Jan. 21, 1964     H. A. FAULCONER     3,119,006

MEANS AND METHOD OF EFFECTING A SOLDERED CONNECTION

Filed July 24, 1961

INVENTOR.
HENRY A. FAULCONER
BY
Lyon & Lyon
ATTORNEYS

United States Patent Office 3,119,006
Patented Jan. 21, 1964

3,119,006
MEANS AND METHOD OF EFFECTING A
SOLDERED CONNECTION
Henry A. Faulconer, % Falcon Laboratories, Viejas Blvd.,
Descanso, Calif.
Filed July 24, 1961, Ser. No. 126,040
12 Claims. (Cl. 219—85)

This invention relates to means and method of effecting a soldered connection, and included in the objects of this invention are:

First, to provide a means and method of effecting a soldered connection which is particularly adapted to effect a connection between a pair of insulated wires, and which not only eliminates the need of stripping the insulation from the wires, but also eliminates the use of a soldering flux.

Second, to provide a means and method of effecting a soldered connection which accomplishes the soldering operation in a minimum of time with a minimum of preparation.

Third, to provide a means and method of effecting a soldered connection wherein a pair of wires are not only soldered but may be automatically severed immediately beyond the solder connection so that a separate trimming operation is avoided.

Fourth, to provide a means and method of effecting a soldered connection which ensures a low resistance connection with substantial distribution of the solder over the surfaces of the wires so as to provide a particularly strong and dependable connection.

Fifth, to provide a means of effecting a soldered connection which incorporates clamping blades adapted to cut through insulation to establish good electrical connection with the wires to be joined, means for applying current to the clamping blades to heat the wires, and means for applying solder against the insulation so that, when the insulation softens by heat, the solder may flow under the insulation, coat the wires, and bridge between the wires to effect a connection.

With the above and other objects in view, as may appear hereinafter, reference is directed to the accompanying drawings in which.

Figure 1:
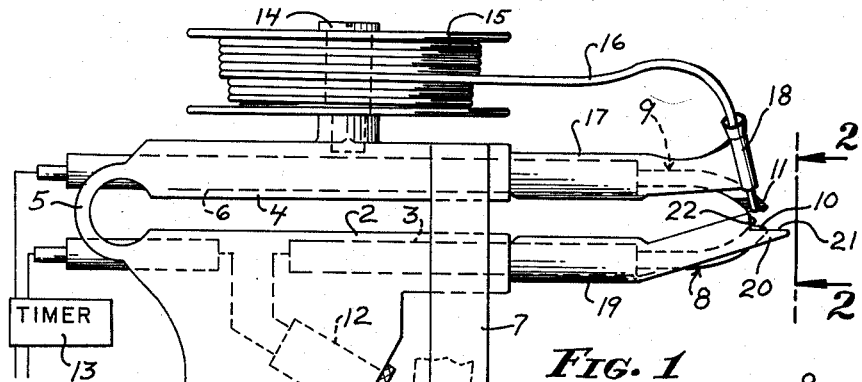
FIGURE 1 is a fragmentary view of a hand tool utilized in effecting a soldered connection.
Figure 2:
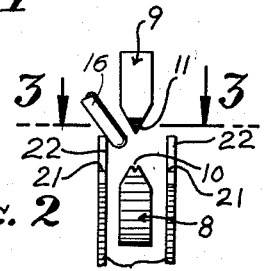
FIGURE 2 is an enlarged, fragmentary, end view taken from the plane 2—2 of FIGURE 1.
Figure 3:
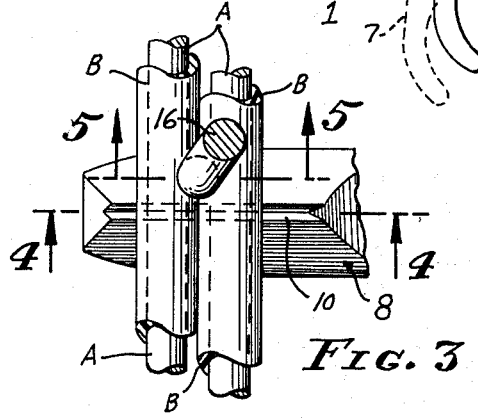
FIGURE 3 is a further enlarged, sectional view taken through 3—3 of FIGURE 2 with the upper jaw of the tool omitted and showing in plan a pair of wires to be soldered.

A tool for the purpose of effecting a soldered connection may take various forms. For purposes of illustration a simple hand tool is shown, which includes a pistol type handle 1 having at its upper end a fixed supporting sleeve 2 in which is mounted a conducting bar 3. Above the sleeve 2 is a movable supporting sleeve 4 connected at one extremity by a U-shaped connecting web 5. The handle 1, sleeves 2 and 4, and connecting web 5 may be formed of heat-resistant material. Fitted in the supporting sleeve 4 is a conducting bar 6.

Attached to the movable supporting sleeve 4, at its end remote from the web 5, is a trigger member 7 which extends downwardly in front of the handle 1, so that it may be rocked to and from the handle 1 in order to move the supporting sleeve 4 to and from the supporting sleeve 2.

Extending from the conducting bars 3 and 6 are lower and upper clamping blades 8 and 9, respectively. These blades curve toward each other at their extremities, and their extremities are beveled to form knife-like edges. The confronting or tip portion of the lower clamping blade 8 is preferably W-shaped in cross section, as indicated by 10. The confronting or tip portion of the upper clamping blade 9 is V-shaped, as indicated by 11. The clamping blades 8 and 9 are preferably formed of tungsten, tungsten alloy, or other material which is not wettable by molten solder, and which does not readily oxidize at the temperature of molten solder.

A switch 12 is arranged in series with the conducting bar 3 and is engageable by the trigger member 7 when the clamping blades 8 and 9 are brought close enough to grip a pair of wires therebetween. Also in the electrical circuit with the conducting bars 3 and 6 is a conventional timer 13, the operation of which is adapted to be initiated when a current is completed through the clamping blades 8 and 9. After a predetermined time interval, the timer opens the circuit even though the switch 12 remains closed, so that the work may be held while the soldered connection hardens.

Mounted on the supporting sleeve 4 is a post 14, which carries a solder reel 15 on which is wrapped a length of wire solder 16. A clip or sleeve 17 is slidably fitted on the portion of the conducting bar 6 projecting from the supporting sleeve 4.

The clip 17 supports a guide tube 18 located at one side of the V-tip 11 of the clamping blade 9, and defines an axis directed downwardly into proximity to the V-tip. The solder 16 is adapted to be threaded through the guide tube 18.

Mounted on the conducting bar 3 is a second clip or sleeve 19 from which extends substantially parallel fingers 20 disposed on opposite sides of and spaced slightly from the W-tip 10. The extremities of these fingers form coplanar upper edges 21 located slightly below the level of the W-tip 10 and upright stop edges 22 immediately behind the W-tip. The fingers 20 aid in placing a pair of wires A on the W-tip 10.

The wires which are to be joined by the solder connection are conventional wires commonly used in electrical and electronic circuits, and are covered or encased in insulation B formed of plastic material.

A typical, conventional plastic insulation is formed from polytrifluorochloroethylene, polytetrafluoroethylene, various polyamides, polyethylenes, or polyvinylchlorides, and many blends and copolymers of these plastics. It should be understood that this list of plastic insulating materials represents only a fraction of the materials used for electrical insulation and which are adapted to the purposes of this invention.

A desirable characteristic of insulation for conductors is that the insulation and the metal wire be inert, each to the other; for example, that the insulation not have the effect of oxidizing the wire. It is a desirable characteristic also, although not essential to the present invention, that the plastic insulation should not bond to the wire.

The method of effecting a soldered connection involves the step of clamping a pair of wires A in juxtaposition. This is accomplished by squeezing the trigger member 7 so as to bring the clamping blades 8 and 9 into yieldable clamping engagement with the wires. The tips of the blades are sufficiently sharp and the pressure applied is such that the tips of the blades force their way through the insulation B, into electrical contact with the wires A, and, preferably, bite into the wires a limited distance.

The final movement of the trigger member 7 closes the switch 12 so that, as electrical contact is established between the clamping blades 8 and 9 and the wires, an electrical circuit is completed across the tips of the clamping blades.

Figures 5, 6, 8:
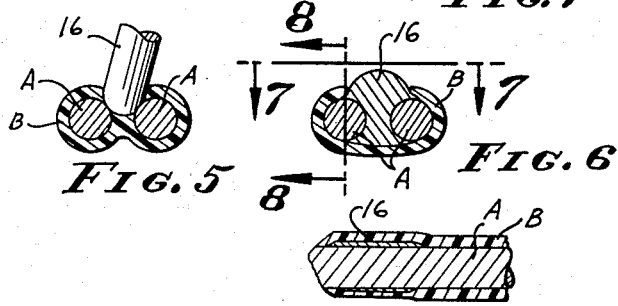
FIGURE 5 is a transverse, sectional view of the wires as they appear during the initial soldering operation as the solder comes into contact with the wires.
FIGURE 6 is a similar sectional view taken through the completed soldered connection.
FIGURE 8 is a fragmentary, sectional view of the soldered connection taken through 8—8 of FIGURE 6.

Sufficient current is applied to heat the wires locally and soften or melt the insulation. At the same time the tip of the wire solder 16 is pressed downwardly onto the insulation, and, as the insulation softens, the solder presses through the insulation until it comes into contact with the heated wires, as shown in FIGURE 5.

The force necessary to press the solder through the softened insulation is quite small. The force may be supplied manually by gripping the solder between the fingers and pressing downwardly. However, solder wire has a limited amount of springiness so that the portion of the solder wire between the spool and sleeve may act as a leaf spring to maintain the required force on the tip end in order that it penetrate the insulation.

Almost immediately the extremity of the wire solder 16 melts, and apparently, by reason of a capillary action and by reason of the fact that the solder has a greater density than the insulation, the solder wets the wire and actually flows between and around the wires, under the insulation. As soon as the tip end of the solder is melted, the remaining portion of the wire solder may be withdrawn so as to limit the quantity of solder which is melted.

It should be noted that the insulation is not removed from the wires, but that the solder must be pressed downwardly through the softened insulation. The insulation apparently forms a complete seal around the melting solder so that oxygen is excluded, and as a consequence the solder itself, without the aid of a fluxing agent, wets the wires and bonds thereto.

The soldering operation is almost instantaneous. By reason of the preset interval during which current is applied, the trigger need not be released until after the solder has solidified.

Figure 7:
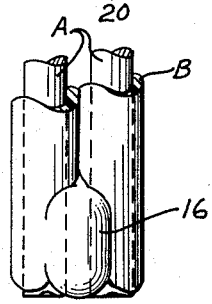
FIGURE 7 is a fragmentary, plan view of the completed soldered connection taken from the plane 7—7 of FIGURE 6.
Figure 4:
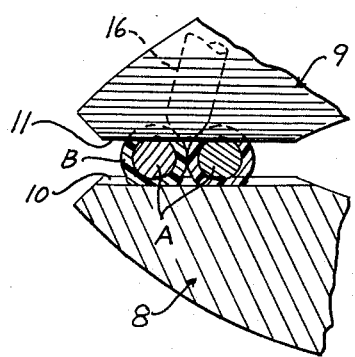
FIGURE 4 is a fragmentary sectional view through 4—4 of FIGURE 3, showing the jaws of the tool clamping a pair of wires to be soldered.

It should be noted that the soldered connection is located at one side of the notches formed in the wire by the tips 10 and 11. These notches may be deep enough that, after the soldered connection has been completed, the ends of the wires beyond the soldered connection may be broken off so that the completed soldered connection appears as shown in FIGURES 7 and 8.

It has been found, however, that as the solder reaches its soldering temperature the wire immediately between the tips 10 and 11 becomes heated to a substantially greater temperature. As a result the tips may be pressed toward each other with a force which will, initially, only cut through the insulation and perhaps nick the wires. If the pressure is maintained, the wire softens sufficiently as it heats to permit the tips to cut completely through the wires so that the unwanted ends of the wires actually fall off.

The soldering operation also causes the insulation on the wires to fuse together a distance beyond the immediate vicinity of the solder. The insulation has low specific heat so that it tends to solidify faster than the solder. As a result the fused insulation holds the wires together for the instant required for the solder to resolidify. Therefore, although the excess portions of the wire may be severed and the jaws released prematurely, insofar as the condition of the solder is concerned the wires are maintained immobilized to ensure a good joint. Also the cooling period is shortened by removal of the unwanted ends and withdrawal of the hot electrodes.

It therefore follows that the soldering operation is reduced to a minimum-time duration. For example, in soldering 19 gauge AWG wire, using 6 volts D.C. at 200 amperes, the soldering time is only 0.16 second duration.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:

1. A method of effecting a soldered connection between a pair of insulated wires, characterized by: establishing an electrical connection between a pair of contiguous insulated wires; applying current to said wires to heat and soften the insulation; and simultaneously pressing solder against the heated insulation to cause the solder to penetrate the heated insulation and contact the heated wires thereby to cause the solder to melt and fuse to the wires.

2. A method of effecting a soldered connection between a pair of insulated wires, characterized by: heating a pair of contiguous wires in the region to be joined while said wires are encased in insulation whereby the insulation is also heated; pressing solder through the heated insulation into contact with the wires; causing the solder to melt and fuse to the wires; and then discontinuing the heating of the wires to permit the solder to solidify.

3. A method of effecting a soldered connection between a pair of insulated wires, characterized by: cutting through the insulation encasing a pair of contiguous wires and into the wires to establish a severance plane and to effect an electrical connection; applying current to said wires to heat said wires in the region of said severance plane and to soften the encasing insulation; pressing solder through the softened insulation at one side of said severance plane into contact with said wires thereby to cause the solder to fuse to said wires; then terminating the application of current to cause the solder to solidify at one side of said severance plane; and then severing the wires at said severance plane.

4. A method of effecting a soldered connection; encasing a pair of metal elements in an insulating plastic material; placing the elements in contiguous relation; applying current to a localized region of the elements to soften the encasing insulation; pressing solder through the heated insulation into contact with the heated region of said elements thereby to cause said solder to fuse to the elements underlying the insulation; then discontinuing the application of current to permit solidification of the solder.

5. A method of effecting a soldered connection; encasing a pair of metal elements in an insulating plastic material; placing the elements in contiguous relation; penetrating said insulation to establish a bridging electrical connection between said elements; applying current through said electrical connection to effect heating of said elements in a localized region under said insulation and to heat and soften the insulation thereover; pressing solder through the heated insulation into contact with the heated region of said elements thereby to cause said solder to fuse to the elements underlying the insulation; then discontinuing the application of current to permit solidification of the solder.

6. A means for effecting a soldered connection between a pair of insulation covered wires, comprising: a pair of contact blades having confronting edges adapted to be forced through the insulation encasing a pair of wires to be joined, thereby to establish a bridging electrical connection between said wires and between said blades; means for applying electrical current to said blades thereby to heat said wires in the region of said blades and to heat and soften the covering insulation; means for feeding solder against the insulation adjacent said blades to force the solder therethrough and into contact with said wires whereby the solder fuses to said wires; and timing means for terminating the heating of said wires thereby to permit the fused solder to solidify.

7. A means for effecting a soldered connection between a pair of insulation covered wires, comprising: a pair of contact blades having sharpened confronting edges; means for forcing said blade edges through insulation encasing a pair of contiguous wires and into said wires to weaken said wires in a common plane for subsequent severance in said plane, said blades also establishing an electrical connection between said blade edges and said wires; means for applying electrical current to said blades thereby to heat said wires adjacent said severance plane and to soften the encasing insulation; means for pressing a tip of solder against the heated insulation to force the solder therethrough and into contact with said wires adjacent to said severance plane whereby the solder fuses to said wires; and timing means for terminating the heating of said wires thereby to permit the solder to solidify, whereupon said wires may be severed at said plane beyond said solder.

8. Means for effecting a soldered connection between a pair of contiguous metal elements, comprising: means including a pair of sharpened contact blades for clamping and penetrating said elements to establish a severance plane; means for applying current to said contact blades thereby to heat said elements; means for applying solder to said elements contiguous to said blades and at one side of said severance plane whereby said solder fuses to said elements; and a timer for terminating current to said contact blades to permit said solder to solidify, whereupon said elements may be severed at said severance plane.

9. A method of effecting a soldered connection between a pair of contiguously positioned insulated wires, characterized by: gripping the wires between cutting blades with a force to penetrate the insulation and establish electrical connection bridging between said wires; applying current to said blades to heat said wires locally, sufficiently to permit said blades to sever said wires and to soften said insulation; and urging solder through the softened insulation into fusing contact with said wires prior to severance of said wires.

10. A method of effecting a soldered connection between a pair of contiguously positioned insulated wires, characterized by: gripping the wires between cutting blades with a force to penetrate the insulation and establish electrical connection bridging between said wires; applying current to said blades to heat said wires locally, sufficiently to soften said wires and permit said blades to sever said wires; simultaneously softening said insulation and causing the insulation of both wires to fuse together; pressing solder through the softened insulation into fusing contact with said wires prior to severance of said wires; and releasing said blades from the wires while holding the wires together by the fused insulation.

11. Means for effecting a soldered connection between contiguous metal elements, comprising: opposed clamp and contact blades having sharpened contact edges adapted to embed in said elements to form weakened zones electrically connecting said blades; means for applying current to said blades for flow through said blades thereby to heat said elements in said weakened zones to a solder-fusing temperature; and means for applying solder to one side only of said weakened zones.

12. Means for effecting a soldered connection between contiguous, insulation-covered, metal elements, comprising: opposed clamp and contact blades having sharpened contact edges adapted to be forced through said insulation and embed in said elements to form weakened zones electrically connecting said blades; means for applying current to said blades thereby to heat said elements in said weakened zones, to heat and melt said insulation, and to raise said elements to a soldering temperature; and means for forcing solder through said heated insulation at one side only of said weakened zones.

References Cited in the file of this patent
UNITED STATES PATENTS

| | | |
|---|---|---|
| 1,142,306 | Clemens | June 8, 1915 |
| 1,639,688 | Duncan | Aug. 23, 1927 |
| 2,221,646 | McPherson | Nov. 12, 1940 |
| 2,283,158 | Humphrey | May 12, 1942 |